(12) United States Patent
Hughes (10) Patent No.: US 11,293,551 B2
(45) Date of Patent: Apr. 5, 2022

(54) BREAK-SEAL SYSTEM WITH BREAKABLE-MEMBRANE BRIDGING RINGS

(71) Applicant: ColdQuanta, Inc., Boulder, CO (US)

(72) Inventor: Steven Michael Hughes, Louisville, CO (US)

(73) Assignee: ColdQuanta, Inc., Boulder, CO (US)

( * ) Notice: Subject to any disclaimer, the term of this patent is extended or adjusted under 35 U.S.C. 154(b) by 0 days.

(21) Appl. No.: 16/544,834

(22) Filed: Aug. 19, 2019

(65) Prior Publication Data

US 2020/0103032 A1    Apr. 2, 2020

Related U.S. Application Data

(60) Provisional application No. 62/739,277, filed on Sep. 30, 2018.

(51) Int. Cl.
*F16J 15/10* (2006.01)

(52) U.S. Cl.
CPC ..................... *F16J 15/10* (2013.01)

(58) Field of Classification Search
CPC . F16J 15/10; H01J 21/02; B65B 31/02; B65B 31/028
USPC ............................................................ 53/79
See application file for complete search history.

(56) References Cited

U.S. PATENT DOCUMENTS

| 1,785,696 A | 12/1930 | Robert |
| 2,908,555 A | 10/1959 | Karl |
| 3,053,413 A | 9/1962 | Irving |
| 3,091,489 A | 5/1963 | Vaughn |
| 3,514,115 A | 5/1970 | Gallo |
| 3,630,532 A | 12/1971 | Traub |
| 3,670,914 A | 6/1972 | Poulsen |
| 3,744,805 A | 7/1973 | Heinrich |
| 3,749,271 A | 7/1973 | Ellis |
| 4,457,455 A | 7/1984 | Meshberg |
| 4,523,764 A | 6/1985 | Albers |
| 4,562,942 A | 1/1986 | Diamond |
| 4,641,765 A | 2/1987 | Diamond |
| 4,645,414 A | 2/1987 | DeHart |
| 4,696,411 A | 10/1987 | Graf |
| 4,851,821 A | 7/1989 | Howard |
| 4,857,160 A | 8/1989 | Landau |
| 4,886,178 A | 12/1989 | Graf |
| 4,889,250 A | 12/1989 | Beyer |
| 4,923,584 A | 5/1990 | Bramhall |

(Continued)

*Primary Examiner* — Anna K Kinsaul
*Assistant Examiner* — Himchan Song
(74) *Attorney, Agent, or Firm* — Clifton Leon Anderson; Van Pelt, Yi & James LLP (57) ABSTRACT

A monolithic break-seal includes a membrane that separates an outer ring from an inner ring. The inner ring is bonded to a vacuum cell and the outer ring is bonded to a vacuum interface. To protect against unintentional breakage of the membrane, a surface of the outer ring not bonded to the vacuum interface contacts the vacuum cell. An external vacuum system evacuates the vacuum cell through an aperture of the break-seal. Once a target vacuum level is reached for the vacuum cell, a cap is bonded to the inner ring, blocking the aperture and hermetically sealing the vacuum cell. The membrane is broken so that the hermetically sealed vacuum cell can be separated from the vacuum interface to which the outer ring remains bonded.

13 Claims, 11 Drawing Sheets

(56) References Cited

U.S. PATENT DOCUMENTS

| | | | |
|---|---|---|---|
| 5,041,267 A | 8/1991 | Randtke | |
| 5,102,010 A * | 4/1992 | Osgar | B65D 47/36 |
| | | | 222/1 |
| 5,106,565 A | 4/1992 | Saitoh | |
| 5,155,969 A | 10/1992 | Kuethe | |
| 5,333,882 A | 8/1994 | Azibert | |
| 5,375,853 A | 12/1994 | Wasser | |
| 5,433,639 A | 7/1995 | Zahuta | |
| 5,468,002 A | 9/1995 | Wasser | |
| 5,457,939 A | 10/1995 | Bardou | |
| 5,493,177 A | 2/1996 | Muller | |
| 5,560,182 A * | 10/1996 | Garwood | B65B 7/168 |
| | | | 426/118 |
| 5,713,576 A | 2/1998 | Wasser | |
| 6,109,617 A | 8/2000 | Laney | |
| 6,142,478 A | 9/2000 | Pecht | |
| 6,454,268 B1 | 9/2002 | Muraki | |
| 6,485,256 B1 | 11/2002 | Iketani | |
| 6,506,272 B1 | 1/2003 | Aggas | |
| 6,626,436 B2 | 9/2003 | Pecht | |
| 7,255,494 B2 | 8/2007 | Zheng | |
| 7,308,819 B2 | 12/2007 | Kamio | |
| 7,311,308 B2 | 12/2007 | Iketani | |
| 7,348,203 B2 * | 3/2008 | Kaushal | B81B 7/0041 |
| | | | 250/239 |
| 7,377,518 B2 | 5/2008 | Lai | |
| 7,501,151 B2 | 3/2009 | Long | |
| 7,589,950 B2 | 9/2009 | Parkhe | |
| 7,638,168 B2 | 12/2009 | Boroson | |
| 7,647,970 B2 | 1/2010 | Mueller | |
| 7,665,975 B2 | 2/2010 | Parmeter | |
| 7,758,051 B2 | 7/2010 | Roberts | |
| 7,922,656 B2 | 4/2011 | Beckman | |
| 8,251,900 B2 | 8/2012 | Ortiz | |
| 8,409,901 B2 | 4/2013 | El-Gamal | |
| 8,596,314 B2 | 12/2013 | Py | |
| 9,169,155 B2 | 10/2015 | Dennis | |
| 9,599,229 B2 | 3/2017 | Evans | |
| 9,732,552 B2 | 8/2017 | Jones | |
| 9,969,022 B2 | 5/2018 | Parkhe | |
| 2002/0179921 A1 | 12/2002 | Cohn | |
| 2003/0109903 A1 | 6/2003 | Berrang | |
| 2004/0232152 A1 | 9/2004 | Schimmelmann | |
| 2005/0034427 A1 | 2/2005 | Higer | |
| 2005/0092933 A1 * | 5/2005 | Moriya | H01J 37/20 |
| | | | 250/440.11 |
| 2005/0148823 A1 | 7/2005 | Vaugh | |
| 2005/0173870 A1 | 8/2005 | Gunderson | |
| 2006/0161050 A1 | 7/2006 | Butler | |
| 2006/0173492 A1 | 8/2006 | Akerfeldt | |
| 2006/0260713 A1 | 9/2006 | Pyszczek | |
| 2008/0315527 A1 | 8/2008 | Ristic | |
| 2009/0007492 A1 | 1/2009 | Rudduck | |
| 2009/0014867 A1 | 1/2009 | Krawiec | |
| 2009/0045349 A1 * | 2/2009 | Sprinzak | H01J 37/20 |
| | | | 250/432 R |
| 2009/0218349 A1 | 9/2009 | Metzger | |
| 2010/0059937 A1 | 3/2010 | Castleman | |
| 2010/0112815 A1 | 5/2010 | O'Dougherty | |
| 2010/0193398 A1 * | 8/2010 | Marsh | H01J 37/20 |
| | | | 206/710 |
| 2011/0015491 A1 | 1/2011 | Ravikumar | |
| 2011/0215530 A1 | 9/2011 | Vasagar | |
| 2011/0271650 A1 * | 11/2011 | Ehrmann | B65B 31/028 |
| | | | 53/510 |
| 2012/0074691 A1 | 3/2012 | Bantz | |
| 2013/0183121 A1 | 7/2013 | Isomura | |
| 2014/0054905 A1 | 2/2014 | Brandt | |
| 2014/0059933 A1 | 3/2014 | Jones | |
| 2014/0087099 A1 | 3/2014 | Veerasamy | |
| 2015/0069713 A1 | 3/2015 | Epshetsky | |
| 2015/0200029 A1 * | 7/2015 | Hughes | G21K 1/006 |
| | | | 250/251 |
| 2015/0348745 A1 * | 12/2015 | Gardiner | F16J 15/064 |
| | | | 250/307 |
| 2016/0116066 A1 | 4/2016 | Watanabe | |
| 2017/0305586 A1 * | 10/2017 | Rizzi | B29C 66/112 |
| 2018/0118389 A1 * | 5/2018 | Harrison | B65B 7/2878 |
| 2018/0233338 A1 * | 8/2018 | Hughes | H01J 41/18 |
| 2019/0084166 A1 * | 3/2019 | Arizono | G21F 7/04 |
| 2021/0130948 A1 * | 5/2021 | Lam | C23C 16/4404 |

* cited by examiner

BREAK-SEAL SYSTEM WITH BREAKABLE-MEMBRANE BRIDGING RINGS

BACKGROUND

The study and applications of quantum phenomena are typically conducted in ultra-high vacuums (UHVs), e.g., within a UHV cell. Such a vacuum cell can be evacuated using an external vacuum system. Once a target vacuum level is achieved, the cell needs to be sealed without impairing the already-achieved vacuum. Preferably, the seal will add little to the size and weight of the vacuum cell. Also, preferably, the seal will provide optical access (e.g., to laser beams) to the interior of the vacuum cell.

DETAILED DESCRIPTION

The present invention provides a low-profile break-seal that allows evacuation to high-vacuum levels of a vacuum cell, followed by convenient hermetic sealing of the vacuum cell. Reducing the profile of the break-seal kit assembly reduces the amount of wasted materials, the size of the package on the vacuum station, and the difficulty in handling complex geometries of subassemblies for mounting on a vacuum station. Established wafer handling processes and machines can be leveraged to remove the human factor in most of the assembly and bonding process, thus enabling modified integrated circuit or Micro-Electronic Machines Systems (MEMS) assembly and process lines to be used. This allows for one vacuum station to process an array of cells at once. This parallelism can reduce the complexity of assembly at scale since individual wafers can be bonded concurrently, resulting in multiple packages that can then be vacuum processed and sealed in one step.

Reducing the profile of the break-seal itself allows for a reduction in the profile of a vacuum cell hermetically sealed by the break-seal. Reducing the cell profile improves the robustness of the sealed vacuum cell. Removing unnecessary protrusions eliminates points of snagging or impact during part handling and installation. Keeping smoother external profiles with minimal protrusions also simplifies packaging especially where stringent shock-vibe specs are required as geometrically simpler packaging is typically easier to engineer to be robust with insulation and dampening features.

Figure 1:
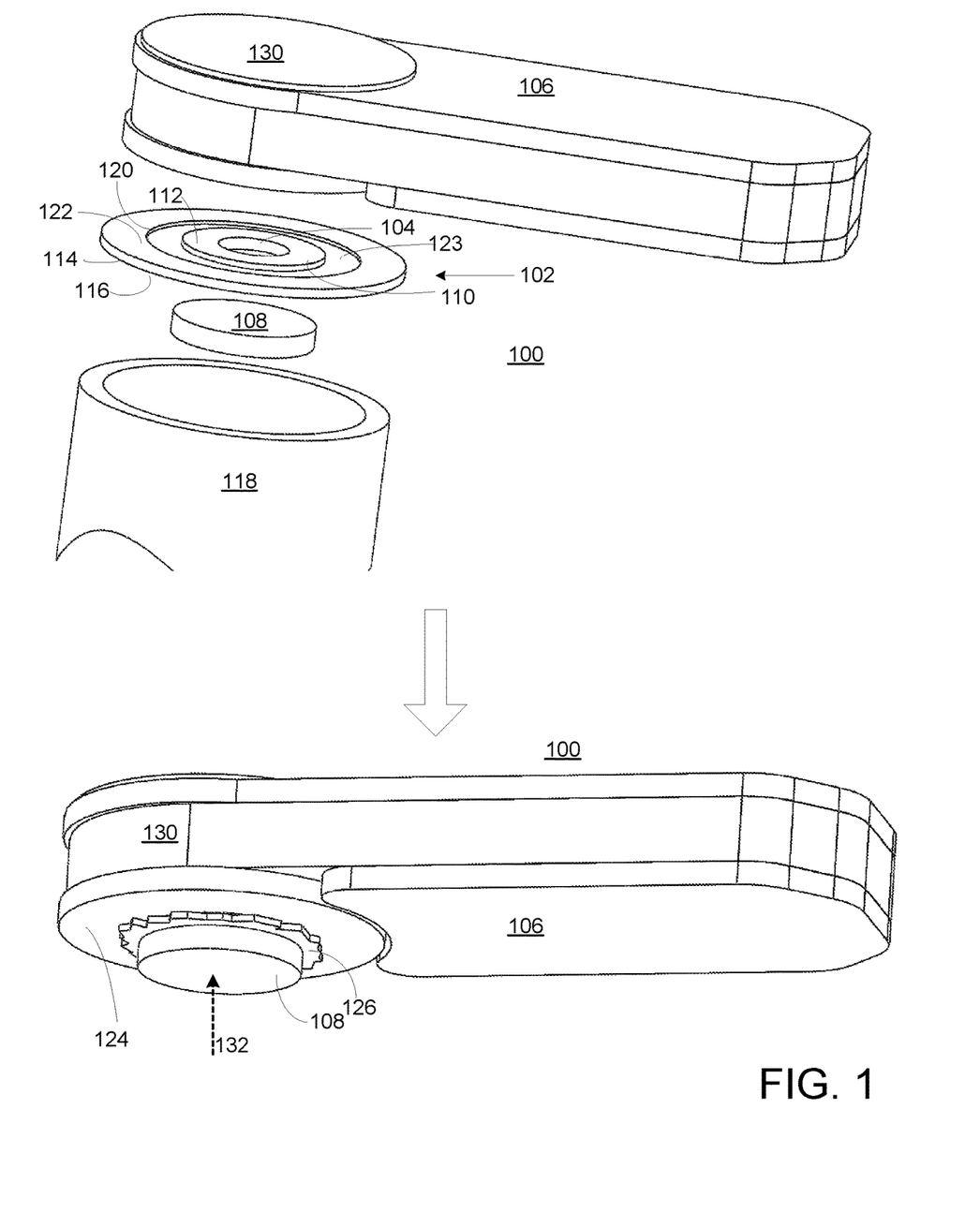
FIG. 1 shows a break-seal system with an intact break-seal and after the break-seal is broken.
Figure 2:
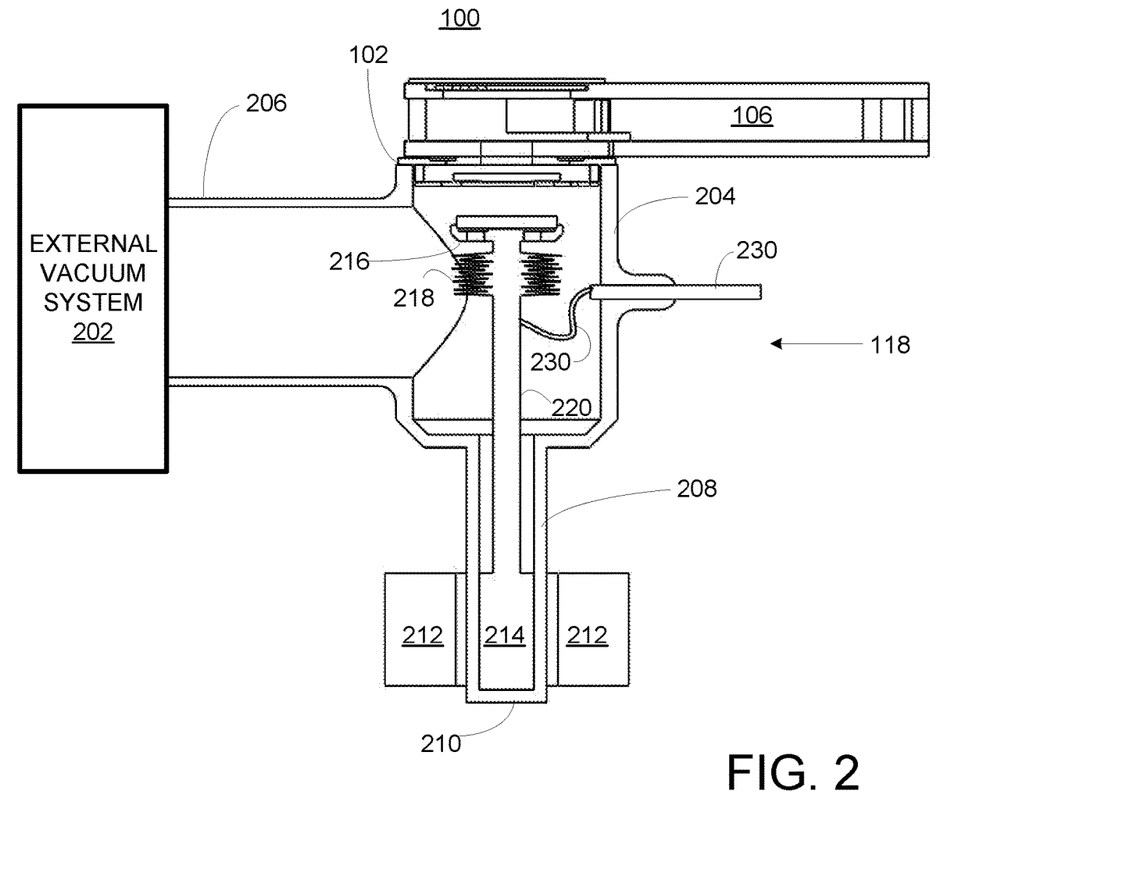
FIG. 2 is a cut-away side view of the break-seal system of FIG. 1 during evacuation of a vacuum cell by an external vacuum system.

As shown in FIG. 1, a break-seal system 100 includes: 1) a break-seal 102 that has a seal aperture 104 through which material being evacuated from a vacuum cell 106 can pass; and 2) a cap 108 for sealing the break-seal aperture 104 once an appropriate vacuum has been achieved. Break-seal 102 includes: 1) an inner ring 110 with a cell-facing surface 112 for bonding to the cell; and 2) an outer ring 114 with an exhaust-facing surface 116 for bonding to an exhaust interface 118; exhaust interface 118 couples vacuum cell 106 to an external vacuum system 202 (FIG. 2).

Figure 3:
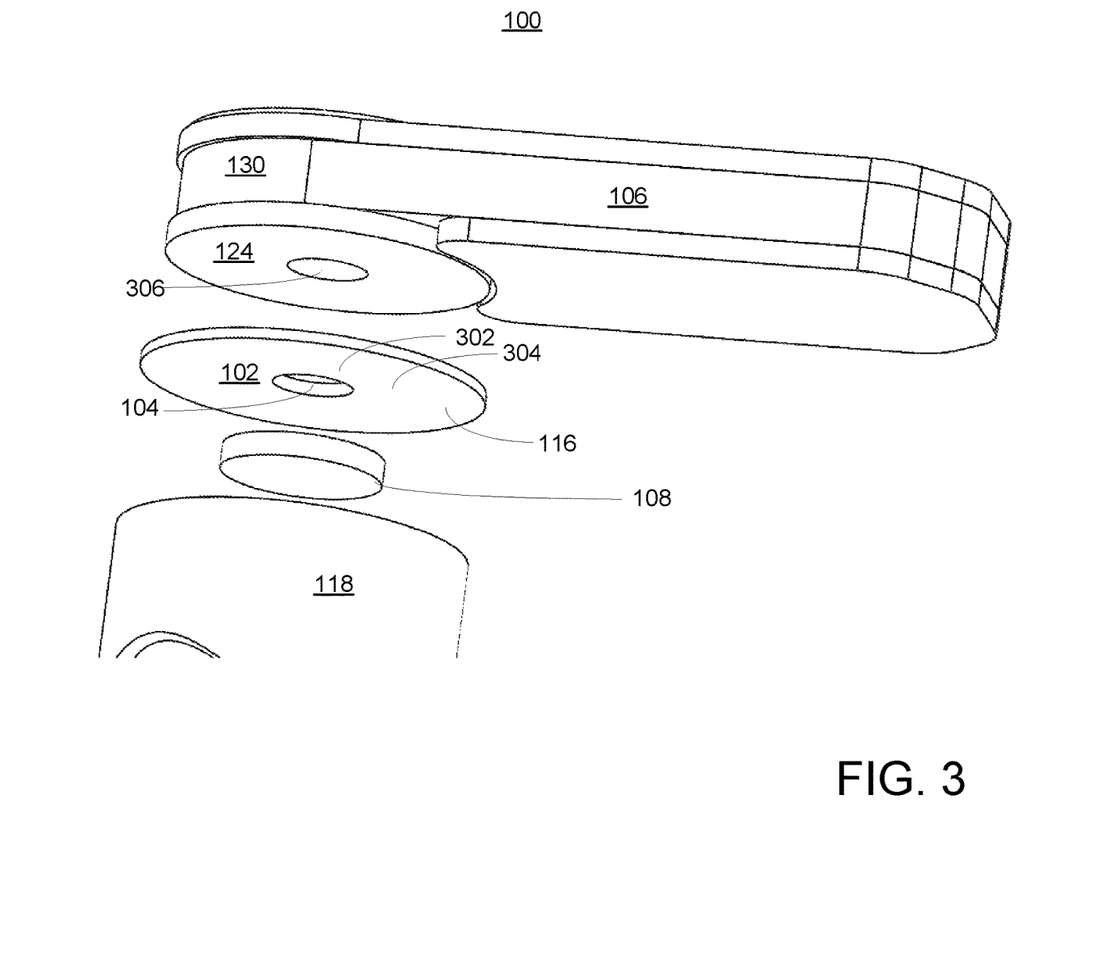
FIG. 3 is a bottom perspective view of the break-seal system of FIG. 1 prior to bonding of the break-seal to the vacuum cell.

Break-seal 102 is a monolithic structure with a membrane 120 bridging inner ring 110 and outer ring 112. For example, break-seal 102 can be fabricated from a silicon disk in part by photolithographically or otherwise etching material to defined membrane 120. Inner ring 110 has cell facing surface 112 and an exhaust-facing surface 302, shown in FIG. 3. Outer ring 114 includes exhaust-facing surface 116 (FIG. 1) and a cell-facing surface 122 (FIG. 3). Membrane 120 has a cell-facing surface 123 (FIG. 1) and an exhaust-facing surface 304 (FIG. 3). As indicated in FIG. 3, exhaust facing surfaces 302, 116 and 304, are coplanar, while, as indicated in FIG. 1, membrane cell-facing surface 123 is recessed relative to inner-ring cell-facing surface 112 and outer-ring cell-facing surface 122. Thus, membrane 120 is relatively thin. For example, rings 110 and 114 can be 1 millimeter thick, while membrane 120 can be 500±300 microns. In other embodiments of the invention, the membrane and its transitions to the rings are mechanically or chemically polished to minimize risk of premature fractures, e.g., caused by handling stresses being focused by microcuts and fractures; in some such embodiments, the membrane thickness can be between 100 and 500 microns.

In the illustrated embodiment, inner-ring cell-facing surface 112 and outer-ring cell-facing surface 122 are coplanar so that outer-ring cell-facing surface 122 contacts a wall 124 of vacuum cell 106 when inner-ring 110 is bonded to wall 124. The purpose of having the outer ring contact the cell wall is to provide support for the membrane to help prevent its accidental breakage. Since wall 124 is flat in the region contacted by inner ring 110 and outer ring 114, outer-ring cell-facing surface 122 is sufficiently coplanar to inner-ring cell-facing surface 112. In an alternative embodiment in which the cell wall is not flat, the outer-ring cell-facing surface 122 and inner-ring cell-facing surface 112 are not coplanar, but are both conformal to the non-flat (e.g., conical or spherical) vacuum-cell wall.

The cell-facing surface and the exhaust-facing surface of the inner ring and the exhaust-facing surface of the outer ring may be polished or otherwise treated to promote bonding. The cell-facing surface of the outer ring may be treated to prevent or limit bonding. This treatment can include sanding, etching, or deposition of a barrier that prevents diffusion or other bonding mechanisms.

The surfaces may be in contact such that when a vacuum is pulled the atmospheric pressure does not cause flexing of the ring structure as the outer ring is able to rest against a mating but non-bonding surface of the vacuum cell, or against a temporary removable spacer ring between the outer ring and the vacuum cell. Methods of bonding of the outer ring to exhaust interface 118 may be contact, anodic, fritting, brazing, diffusion bonding, indium sealing, epoxy, adhesive, or even elastomer contact sealing. The inner ring is any permanent or sufficiently permanent version of the above set or via other permanent means of attachment, bonding, or integration to form a hermetic seal. The seal itself may or may not be the same as the means of bonding or clamping.

Once membrane 120 is broken and vacuum cell 106 is separated from exhaust interface 118, inner ring 110 remains bonded to vacuum cell 106, while outer ring 114 remains bonded to exhaust interface 118. As shown in the bottom portion of FIG. 1, remnant 126 of membrane 120 may remain with vacuum cell 106, while another remnant can remain with exhaust interface 118. Accordingly, in some scenarios, additional steps may be used to remove some or all these fragments.

As shown in FIG. 2, external vacuum system 202 is coupled to cell 106 via exhaust interface 118 and break-seal 102. External vacuum system 202 is designed to reduce the pressure and thus increase the vacuum level of vacuum cell by drawing out particles from the vacuum cell. While external vacuum system 202 may not achieve the ultimate vacuum desired for cell 106, after the vacuum cell is sealed, higher vacuums can be attained and maintained by an ion pump 130 and/or other means internal to the vacuum cell. Cap 108 is made of a borosilicate glass, e.g., Pyrex®, available from Corning, Inc., or other glass. The thermal coefficient of expansion of the cap is selected to closely match the thermal coefficient of expansion of the break-seal, or, more specifically, its inner ring. The optical properties of the cap are chosen, in part so that a laser beam 132 can be transmitted therethrough to initiate ion pump 130. Alternatively, the transparent cap can be leveraged to permit imaging of the cell interior. In some embodiments, the cap acts as a lens or all or part of a microscope objective for imaging purposes.

In the illustrated embodiment, break-seal 102 is fabricated from monocrystalline silicon. In other embodiments, the break-seal can include other forms of silicon, Pyrex® or other glasses, and ceramics. In the illustrated embodiment, the cap is Pyrex®. In other embodiments, the cap can be, another type of glass or it can be silicon. In embodiments with a silicon cap, the cap can be a window for wavelengths for which silicon is transparent. In an embodiment with a glass break-seal and a silicon cap, the cap can be an electrical conductor to the interior of the cell, while the glass break-seal can an insulator.

As shown in FIG. 2, exhaust interface 118 has a housing 204 with generally cylindrical symmetry and a radially extending branch 206 that connects with external vacuum system 202. Housing 204 has a top end that bonds to outer ring 114 of break-seal 102 (FIG. 1). Toward the bottom, housing 204 takes the form of a hollow tube 208 that is closed at the bottom 210. An annular magnet 212 is slidably coupled to tube 208 so that it can be moved up (toward vacuum cell 106) and down (toward bottom 210).

A ferromagnetic, e.g., UHV compatible steel, piston 214 moves up and down on the inside of tube 208 to track the movement of magnet 212. A pedestal 216 is coupled to piston 214 via a bellows-like spring 218 and a shaft 220. Thus, pedestal 216 moves up and down with the like movement of piston 214 and magnet 212. Pedestal 216 is designed to hold cap 108. When magnet 212 is down, cap 108 is held in a position retracted from break-seal 102, e.g., during pump-down of vacuum cell 106. When pedestal magnet 212 is up, cap 108 can be pressed against break-seal 102 so that cap 106 can be bonded to break-seal inner ring 110 (FIG. 1). Spring 218 serves to ensure that cap 108 is pressed flush against inner ring 110 to ensure an effective and sealing bond.

As shown in FIG. 2, exhaust interface 118 provides an electrical path 230 through an insulator feedthrough 232 so that electrical path 230 is electrically isolated from housing 204. Electrical path 230 is electrically coupled to pedestal 216, while housing 204 is electrically coupled to break-seal 102; as described below, this electrical potential can be used for electrically assisted (e.g., anodic) bonding of cap 108 to break-seal inner ring 110.

Figure 4:
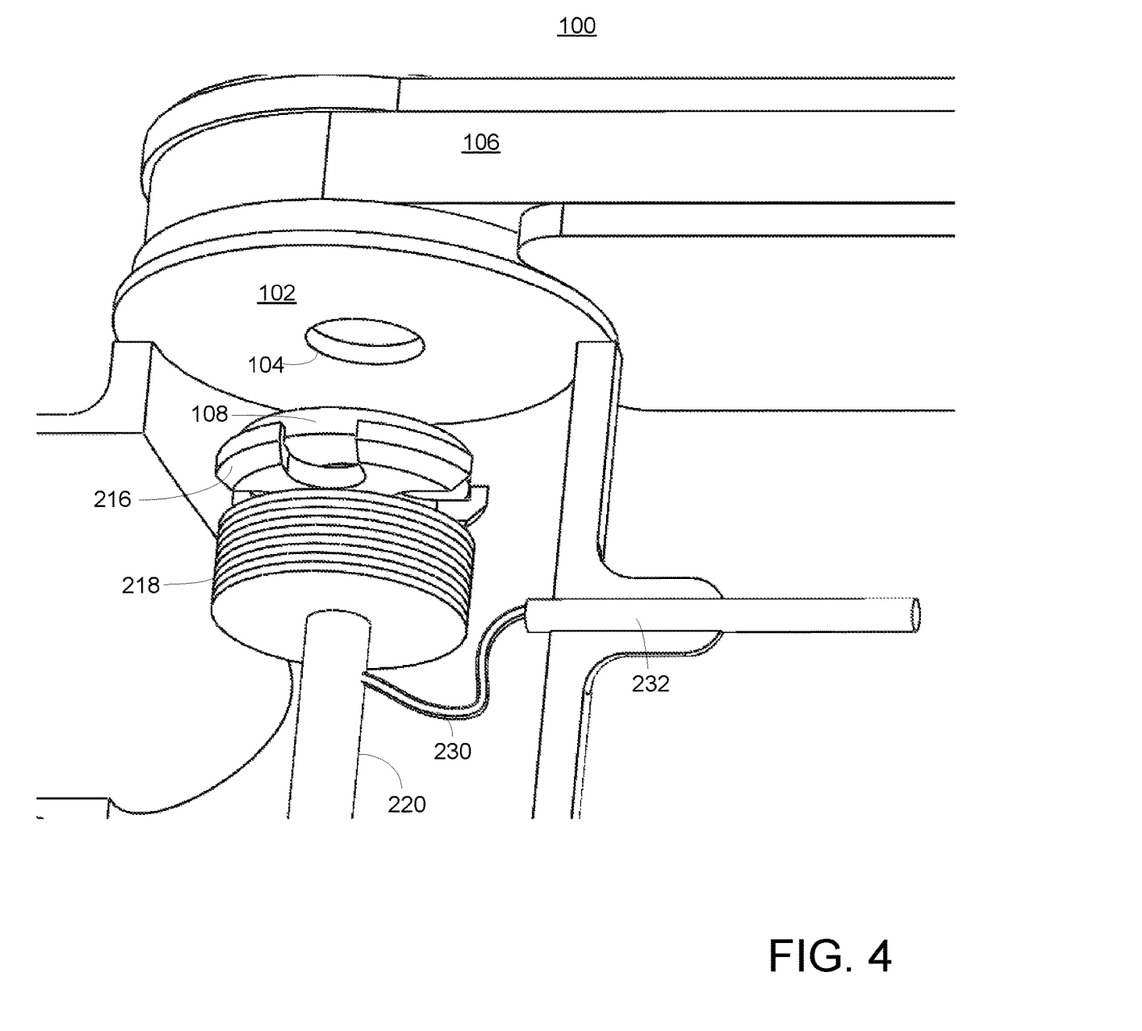
FIG. 4 shows the break-seal system of FIG. 1 after the break-seal is bonded to the vacuum cell and before the cap is bonded to the break-seal.

In FIGS. 2 and 4, pedestal 216 and cap 108 are shown in a retracted position that is typically assumed while external pump system 202 is evacuating vacuum cell 106. In this position, cap 108 does not block break-seal aperture 104, as indicated in FIG. 4.

Figure 5:
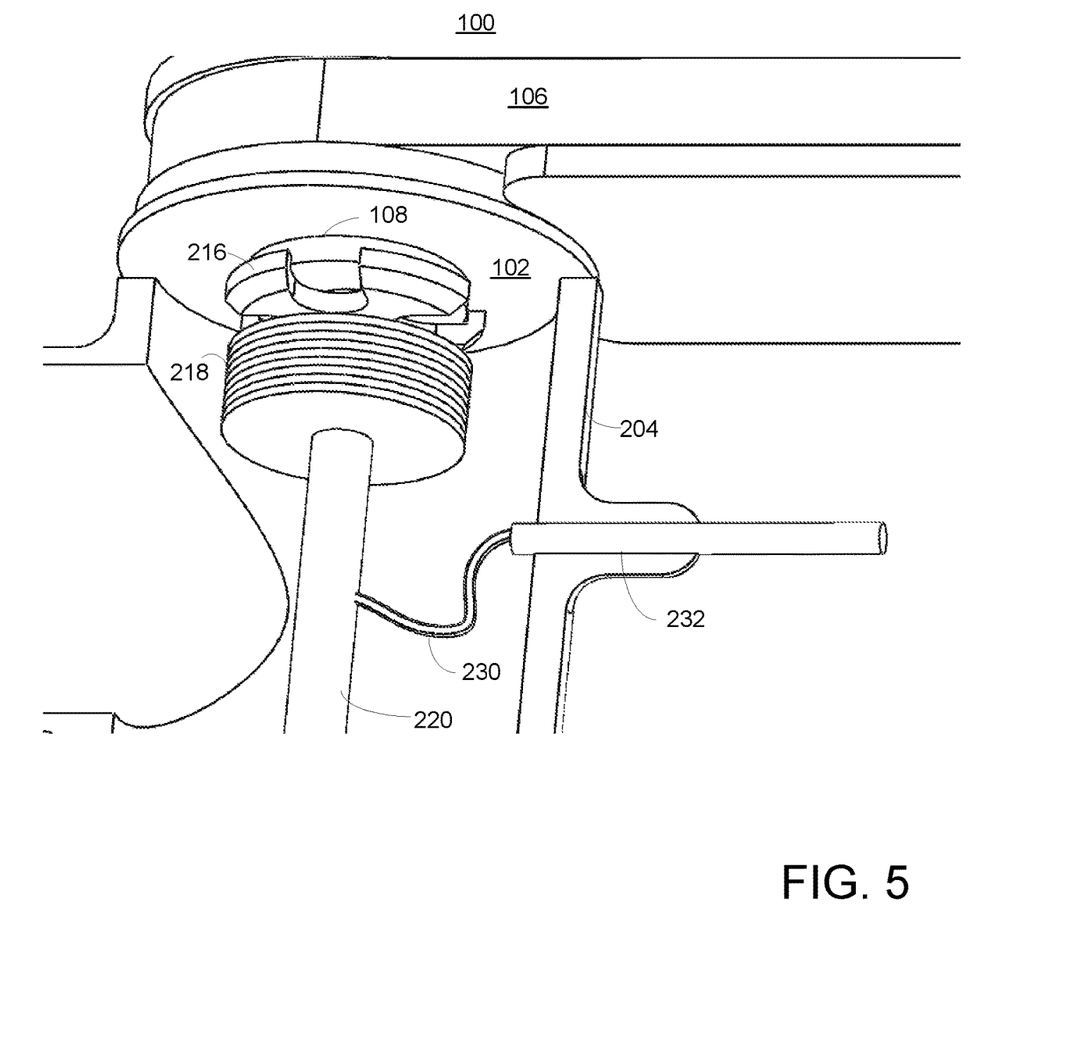
FIG. 5 shows the break-seal system of FIG. 1 during a time that a cap is held in contact with an inner ring of the break-seal.
Figure 6:
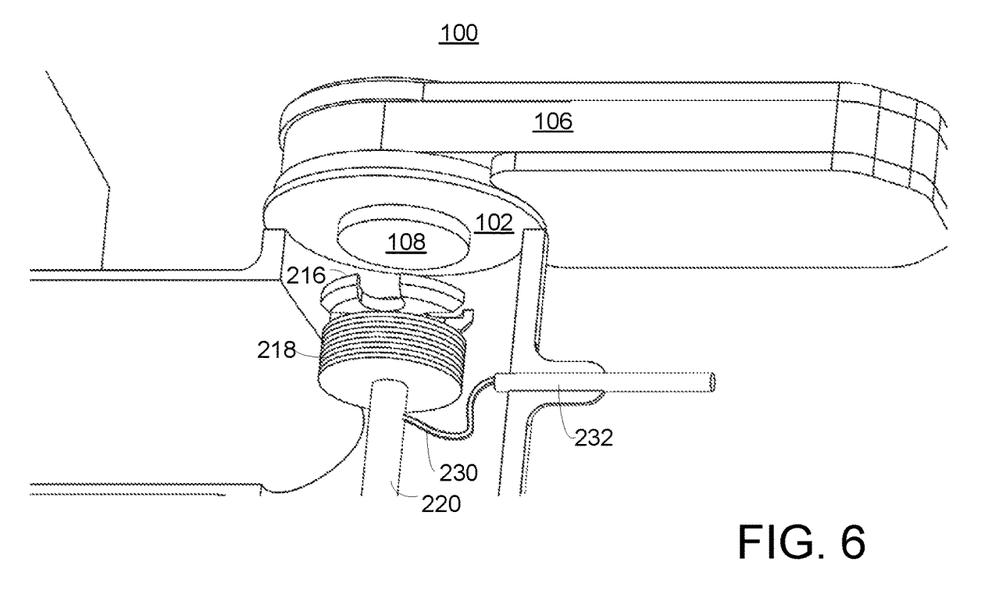
FIG. 6 shows the break-seal system of FIG. 1 after the cap has been bonded to the break-seal and the pedestal that was holding the cap has retracted from the cap.

In FIG. 5, cap 108 and pedestal 216 are shown in an extended position that is typically assumed while cap 108 is being bonded to break-seal 102. In this extended position, spring 218 ensures that cap 108 is pressed flush against break-seal 102 and blocks the break-seal aperture. An electric potential between pedestal 216 (via conductive path 230) and break-seal 102 (via housing 204) provides for electrically-assisted contact bonding, e.g., anodic bonding, of cap 108 to break-seal 102. In various embodiments, bonding is achieved via direct contact bonding, eutectic bonding, transient liquid-phase diffusion bonding, indium bonding, and other forms of bonding. Once bonded, cap 108 completes a hermetic seal of vacuum cell 106. In FIG. 6, pedestal 216 has returned to a retracted position while cap 108 remains bonded to break-seal 102. This sets the stage for breakage of break-seal 102.

Figure 7:
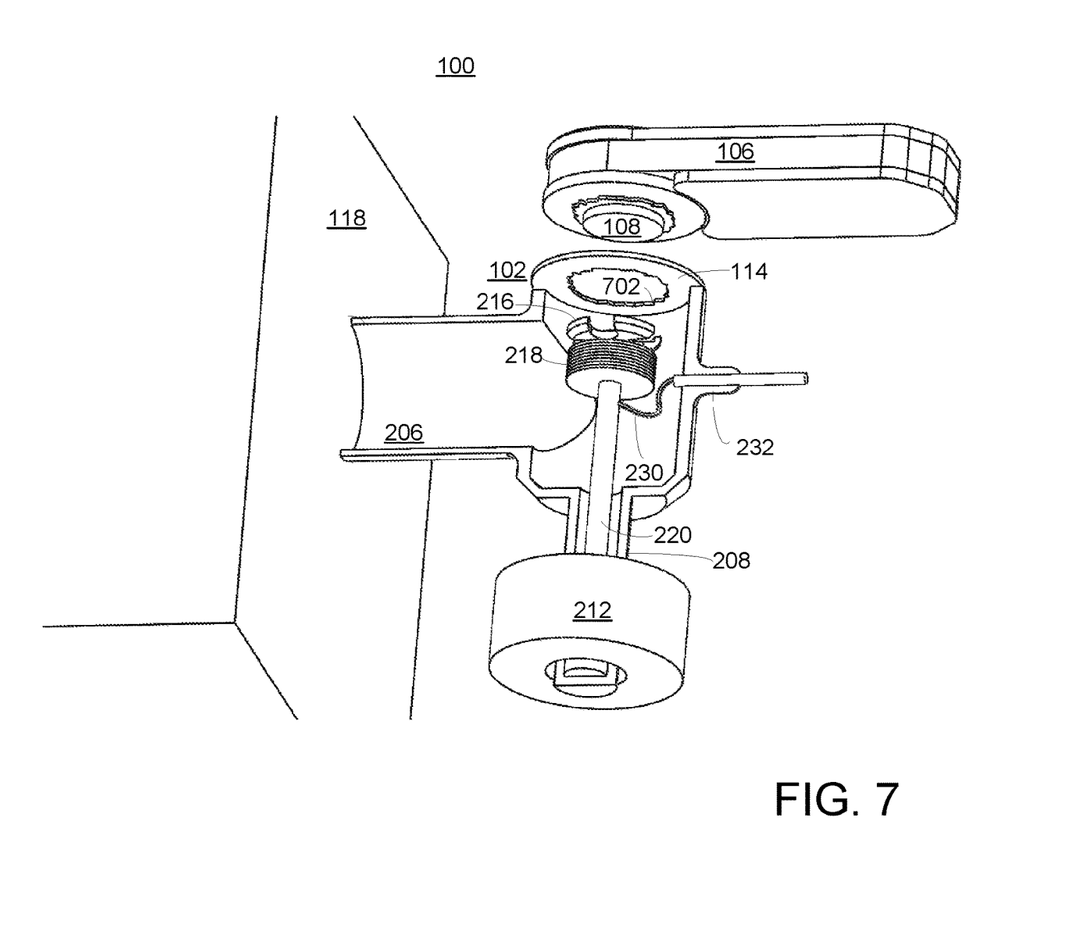
FIG. 7 show the break-seal system of FIG. 1 after the membrane of the break-seal and been broken and the vacuum cell has been separated from the vacuum interface.
Figure 8:
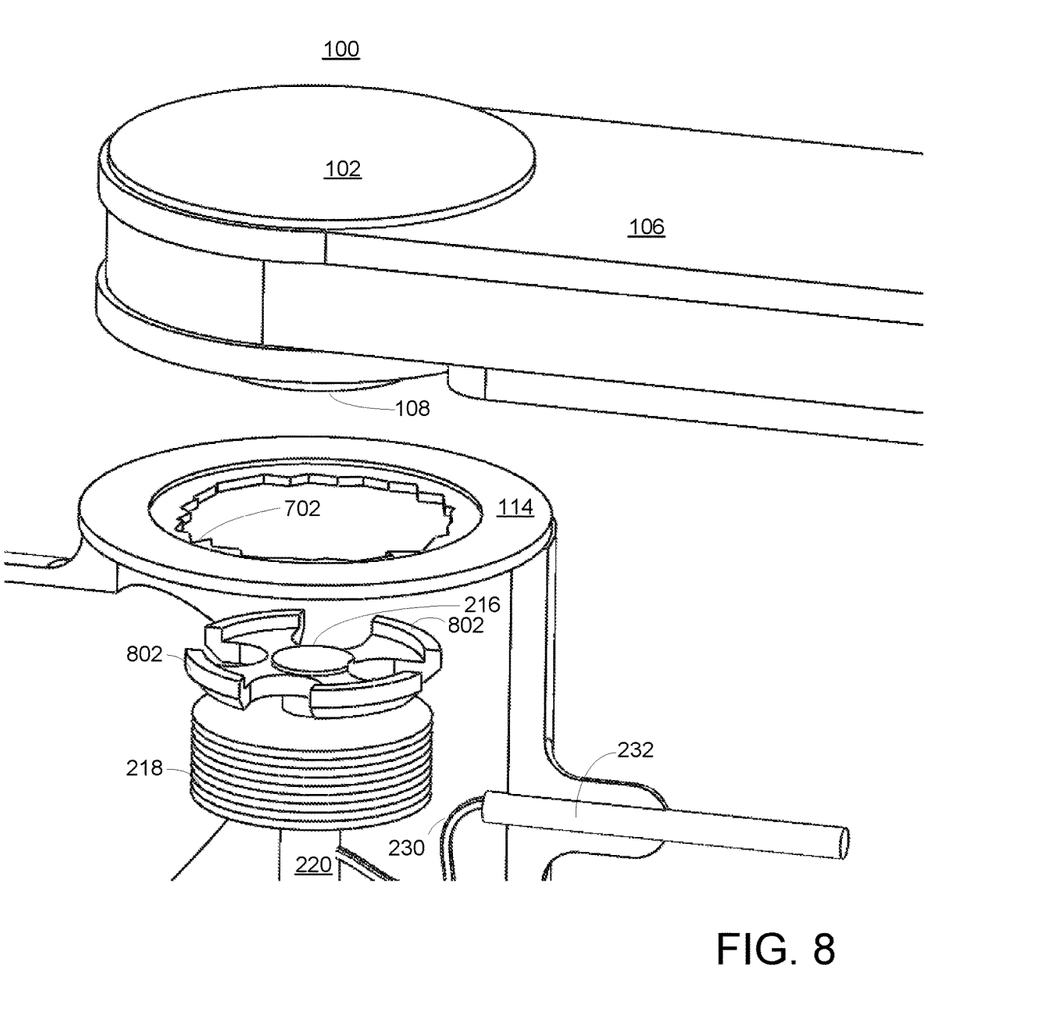
FIG. 8 is an isometric view from above of the break-seal system as represented in FIG. 7.

FIGS. 7 and 8 represent a condition in which break-seal 102 has been broken and vacuum cell 106 has been separated from exhaust interface 118. As best seen in FIG. 7, membrane remnant 126 (those connected to inner ring 110, FIG. 1) remains with vacuum cell 106. As seen in both FIGS. 7 and 8, another membrane remnant 702 (those connected to outer ring 114, FIG. 1) remains with exhaust interface 118. Where desired, one or both remnants may be reduced or removed by mechanical or chemical means. Further remnant and ring 114 may be debonded, etched, or otherwise removed from exhaust interface 118 to reuse 118.

As shown in FIGS. 7 and 8, the break-seal inner ring and cap only minimally increase the size and weight of the vacuum cell. Maintaining a compact form factor for the vacuum cell means that an incorporating system can be proportionally smaller, resulting in greater portability and more flight-friendly specifications for avionics and space applications.

Figure 9:
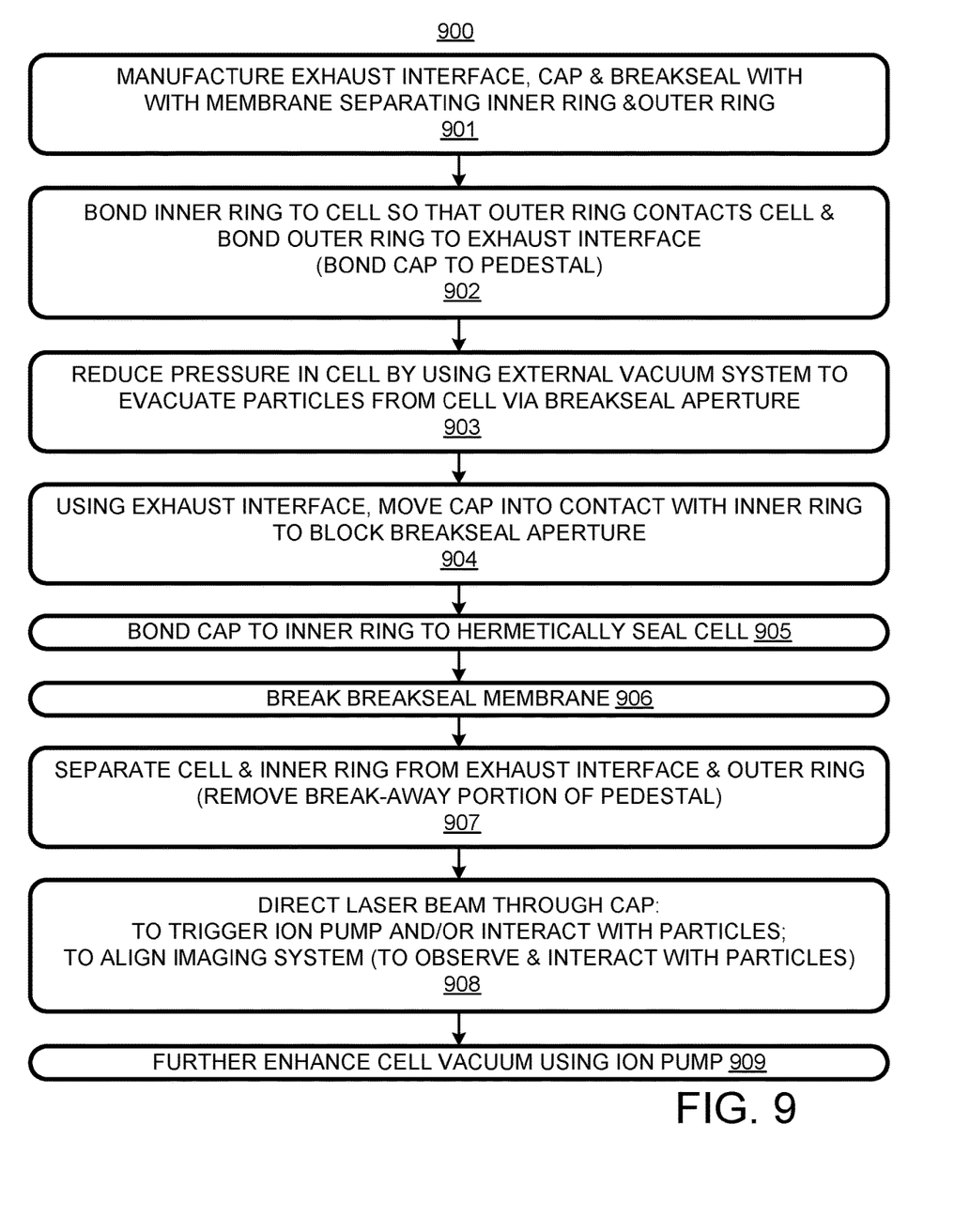
FIG. 9 is a flow chart of a break-seal process implementable on the break-seal system of FIG. 1 and other break-seal systems.

A break-seal process 900 is flow-charted in FIG. 9. At 901, a break-seal kit is manufactured. The kit includes a break-seal, a cap, and an exhaust interface. The break-seal includes a breakable membrane that separates an inner ring of the break-seal from an outer ring of the break-seal.

At 902, the inner ring is bonded to a vacuum cell, while the outer ring is bonded to the exhaust interface. The outer ring contacts the vacuum cell, but is either not bonded to it or is reversibly bonded to it such that, when the vacuum cell is separated from the exhaust interface, the outer ring separates from the vacuum cell and remains bonded to the exhaust interface.

At 903, an external pump system evacuates the vacuum cell. Material flows form the cell, through the break-seal, into the exhaust interface and out through a branch of the exhaust interface and into the external vacuum system.

At 904, using a mechanism of the exhaust interface, moving the cap into contact with the inner ring to block a break-seal aperture. A spring of the exhaust interface ensures that the contact is flush. At 905, the cap is bonded to the inner ring. For example, using a conductive path of the exhaust interface to implement electrically-assisted (e.g., anodic) bonding, the cap can be bonded to the inner ring. Bonding the cap results in hermetic sealing of the vacuum cell. Once the cap is bonded, the mechanism used to move the cap into position for bonding can be retracted.

At 906, the break-seal membrane is broken. The method of inducing a fracture into the intermediate thinned or weakened ring may include: electric arc stressing, mechanical force or torqueing of the inner ring with respect to the outer ring, vibratory or acoustic energy in an impulse or resonant scheme of induction, electro-inductive heating to cause local or targeted expansion of one or multiple rings with respect to others, directed or diffuse radiation coupled with absorptive and reflective features either native or engineered into various surfaces or parts, direct electrical current for heating, electromotive force from a coil or other inductive coupled device, initiation, ignition, or detonation of micro charges or rapid expansion of materials to act as micro charges such as flash evaporation of gases (thus channel may be thin enough to capillary such liquids or pack volatile solids or powders prior to initiation), rapid or slow expansion of compacted or wicked materials in the inner ring such as through water freezing, or moisture absorption of a tough sponge-like material, direct laser ablation, direct ultrasonic erosion, direct arc erosion or electro-discharge machining, or even simply reversing a bond between any of the discs and the outer connecting nipple that goes to the vacuum station.

At 907, the vacuum cell is moved relative to the exhaust interface so that they separate. The inner ring, which is bonded to the vacuum cell, moves with the vacuum cell. The outer ring, which is bonded to the exhaust interface, remains with the exhaust interface.

At 908, a laser beam is directed through the cap (e.g., of a glass): to initiate an ion pump of the vacuum cell; to interact with atoms or other particles; and/or to align an imaging system, e.g., to observe and interact with atoms or other particles. At 909, the operational ion pump either maintains the vacuum level achieved by the external vacuum system or achieves and maintains a greater vacuum level, e.g., UHV.

As best seen in FIG. 8, pedestal 216 includes ridges 802 to maintain cap 108 in alignment with inner ring 110 (FIG. 1) for bonding purposes. More specifically, ridges 802 prevent lateral movement that could result in misalignment or even unintentional escape of cap 108 from pedestal 216; gravity is relied on to prevent vertical displacement of cap 108.

In some scenarios, even with the ridges, some bump or other perturbation might dislodge cap 108. Moreover, changes of orientation (relative to a gravity field) and acceleration might displace cap 108. To address some of these "rougher" scenarios, the cap can be bonded to break-away components of the pedestal; in that case, after the cap is bonded to the inner ring and the pedestal (or at least most of it) retracted, the break-away components may remain with the assembly of the vacuum cell, inner ring, and cap.

Figure 10:
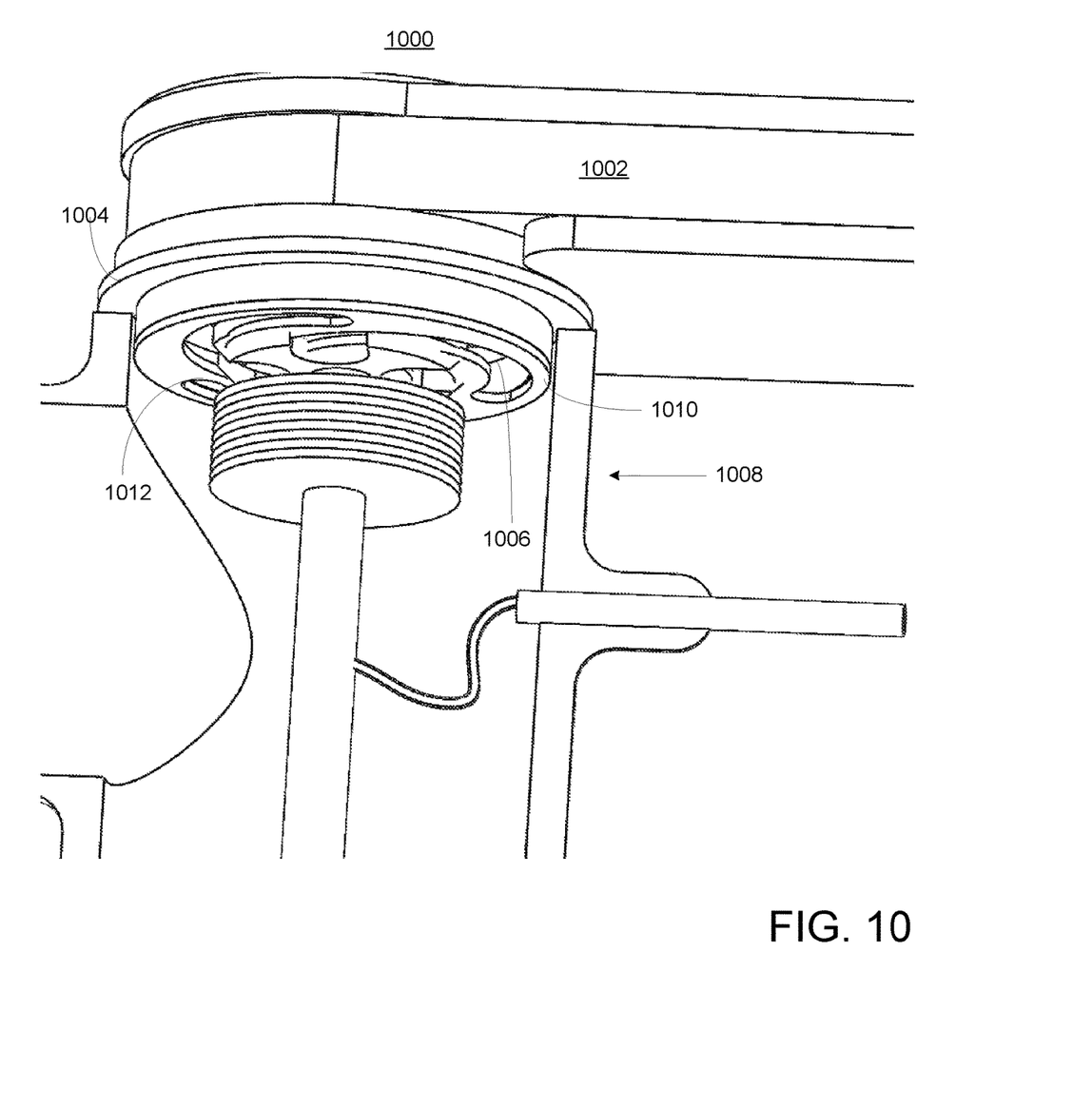
FIG. 10 is a perspective view of an alternative break-seal system using a breakaway pedestal to support a cap used to block a break-seal aperture.

As shown in FIG. 10, a break-seal system 1000 is much the same as break-seal system 100 (FIGS. 1-8) except for the pedestal and its connection to the cap. Break-seal system 1000 includes a vacuum cell 1002, a break-seal 1004, a cap 1006, and an exhaust interface 1008 to an external vacuum system. Exhaust interface 1008 includes a pedestal 1010 with break-away elements 1012; the break-away elements are bonded to cap 1006.

Figure 11:
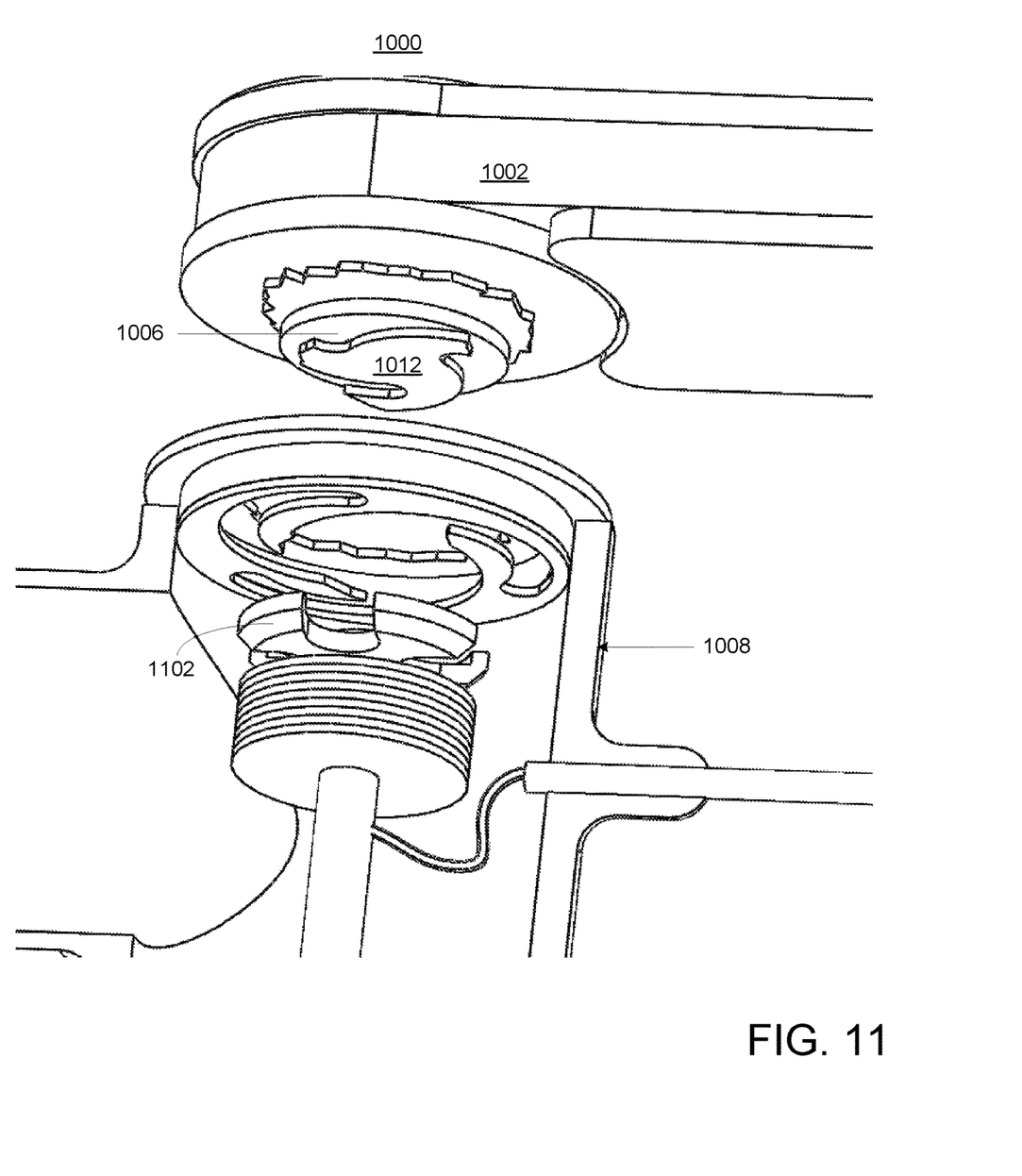
FIG. 11 is a perspective view of the break-seal system of FIG. 10 showing a portion of the pedestal bonded to the cap.

After the break-seal membrane is broken, as shown in FIG. 11, the break-away element 1012 of pedestal 1010 remains bonded to cap 1006. The remainder 1102 of pedestal 1010 remains connected to spring 1104 and shaft 1106 of exhaust interface 1008. Of course, break-away element 1012 can be polished off, e.g., to provide better optical access to the interior of cell 1002. Depending on how the breaks are implemented, the pedestal break can occur before, after, or at the same time as the membrane break.

In alternative embodiments, The cap may be reversibly bonded to the pedestal In some of these embodiments, the pedestal and cap of the same material type to enable debonding of the pedestal remnant after the vacuum cell is sealed with the cap. Reversible bonding may also be solder, indium, or anodic bonding through a permeation barrier (a.k.a. electrostatically assisted contact bonding).

For this embodiment, a couple of actions can be added to break-seal process 900, shown in FIG. 9. At 902, the cap is bonded to the break-away portion of the pedestal. In some cases, at 907, the break-away portion of the pedestal is removed from the cap, e.g., by polishing it away. This removal is intended to clear the way for a laser beam to be transmitted through the cap and into vacuum cell, e.g., to initiate an internal ion pump. Alternatively or in addition, the breakaway portion can be removed to reduce the profile of the final cell.

An array of vacuum chambers could be formed in a large wafer (4"-12" or more in diameter) such that the assembled array of chambers are bonded to an arrayed break seal which only bonds at the ID ring and everywhere else is unable to bond, but still provides stable strain relief with unbondable lapped or passivated surfaces such that the entire array can be mounted and pulled down to vacuum, and then a single plate of sealing windows with identical aligned break grooves is brought into contact and sealed via anodic or other bonding methods. Once bonded the parts are then singulated by encouraging fractures along the break lines allowing for simultaneous and therefore cheaper and faster vacuum processing of large arrays of parts which are then easily singulated without further machining.

Herein, the following definitions apply. "Bridging" an inner ring and an outer ring means extending from the inner ring to the outer ring. Herein, "monolithic" means fabricated from a single piece. For example, the illustrated break-seal can be fabricated from a silicon disk, e.g., by removing material to form the aperture and the membrane. The "outer diameter" of a ring or aperture is the maximum distance between points on a plane orthogonal to an axis of rotational symmetry of the ring or aperture. The "inner diameter" of a ring is the maximum diameter of an aperture defined by the ring. "Flush", as in "in flush contact" refers to a condition in which objects are contact each other over a surface area. Flat surfaces or non-flat conformal surfaces may be in "flush" contact with each other.

Herein, all art labelled "prior art", if any, is admitted prior art; art not labelled "prior art", if any, is not admitted prior art. The illustrated embodiments, variations thereupon, and modifications thereto are provided for by the present invention, the scope of which is defined by the following claims.

What is claimed is:

1. A break-seal system comprising a monolithic structure including:
    an inner ring defining and radially surrounding a break-seal aperture, the inner ring having an inner-ring thickness, a first annular inner-ring surface facing a first direction and a second annular inner-ring surface facing a second direction opposite the first direction;
    an outer ring radially surrounding the inner ring, the outer ring having an outer-ring thickness, the outer ring having a first annular outer-ring surface facing the first direction and being coplanar with the first annular inner-ring surface, and an second annular outer-ring surface facing the second direction; and
    a membrane radially extending from the inner ring to the outer ring, the membrane having an axial membrane thickness less than half the inner-ring thickness and less than half the outer-ring thickness.

2. The break-seal system of claim 1 wherein the membrane includes a first annular membrane surface facing the first direction, the first annular membrane surface being recessed with respect to the first annular inner-ring surface and the first annular outer-ring surface.

3. The break-seal system of claim 2 wherein the membrane includes a second annular membrane surface facing the second direction, the second annular membrane surface being coplanar with the second annular inner-ring surface and with the second annular outer-ring surface.

4. The break-seal system of claim 1 wherein the membrane thickness is 500±300 microns.

5. The break-seal system of claim 4 wherein the membrane is polished on the recessed side, by chemical or mechanical means, to improve yield strength.

6. A break-seal system comprising:
    an inner ring defining and radially surrounding a break-seal aperture, the inner ring having an inner-ring thickness, a first annular inner-ring surface facing a first direction and a second annular inner-ring surface facing a second direction opposite the first direction;
    an outer ring radially surrounding the inner ring, the outer ring having an outer-ring thickness, the outer ring having a first annular outer-ring surface facing the first direction and being coplanar with the first annular inner-ring surface, and an second annular outer-ring surface facing the second direction;
    a membrane radially extending from the inner ring to the outer ring, the membrane having an axial membrane thickness less than half the inner-ring thickness and less than half the outer-ring thickness; and
    a cap having an outer diameter greater than an inner diameter of the inner ring and less than an inner diameter of the outer ring.

7. The break-seal system of claim 6 wherein the outer diameter of the cap is equal to or less than an outer diameter of the inner ring.

8. The break-seal system of claim 6 wherein the cap is at least partially transmissive of laser or imaging light.

9. The break-seal system of claim 6 further comprising a vacuum interface to an external vacuum system.

10. The break-seal system of claim 9 wherein the vacuum interface includes a mechanism for moving the cap into contact with the inner ring.

11. The break-seal system of claim 9 wherein the vacuum interface includes a conductive path used to apply an electric potential to the cap to effect anodic bonding of the cap to the inner ring.

12. A break-seal system comprising:
    an inner ring defining and radially surrounding a break-seal aperture, the inner ring having an inner-ring thickness, a first annular inner-ring surface facing a first direction and a second annular inner-ring surface facing a second direction opposite the first direction;
    an outer ring radially surrounding the inner ring, the outer ring having an outer-ring thickness, the outer ring having a first annular outer-ring surface facing the first direction and being coplanar with the first annular inner-ring surface, and an second annular outer-ring surface facing the second direction;
    a membrane radially extending from the inner ring to the outer ring, the membrane having an axial membrane thickness less than half the inner-ring thickness and less than half the outer-ring thickness; and
    wherein the inner ring is bonded to a vacuum cell, the outer ring is bonded to a vacuum interface to an external vacuum system, and the outer ring is in contact with the vacuum cell such that when the membrane is broken and the vacuum cell is moved away from the vacuum interface, the inner ring remains bonded to the vacuum cell and the outer ring remains bonded to the vacuum interface.

13. The break-seal system of claim 12 wherein the cap is bonded to the inner ring so as to block the break-seal aperture and hermetically seal the vacuum cell.

* * * * *

UNITED STATES PATENT AND TRADEMARK OFFICE
CERTIFICATE OF CORRECTION

PATENT NO. : 11,293,551 B2
APPLICATION NO. : 16/544834
DATED : April 5, 2022
INVENTOR(S) : Steven Michael Hughes It is certified that error appears in the above-identified patent and that said Letters Patent is hereby corrected as shown below:

In the Drawings

In drawing sheets 9 of 11, figure 9, block 901, before "MEMBRANE", delete "WITH".

In the Claims

In Column 7, Line(s) 21, Claim 2, after "claim 1", insert --,--.
In Column 7, Line(s) 26, Claim 3, after "claim 2", insert --,--.
In Column 7, Line(s) 31, Claim 4, after "claim 1", insert --,--.
In Column 7, Line(s) 33, Claim 5, after "claim 4", insert --,--.
In Column 8, Line(s) 6, Claim 7, after "claim 6", insert --,--.
In Column 8, Line(s) 9, Claim 8, after "claim 6", insert --,--.
In Column 8, Line(s) 11, Claim 9, after "claim 6", insert --,--.
In Column 8, Line(s) 13, Claim 10, after "claim 9", insert --,--.
In Column 8, Line(s) 16, Claim 11, after "claim 9", insert --,--.
In Column 8, Line(s) 44, Claim 13, after "claim 12", insert --,--.

Signed and Sealed this
Fifth Day of September, 2023

Katherine Kelly Vidal
*Director of the United States Patent and Trademark Office*